H. M. YOUNG.
VEHICLE WHEEL.
APPLICATION FILED MAY 21, 1910.
990,328.
Patented Apr. 25, 1911.
3 SHEETS—SHEET 2.
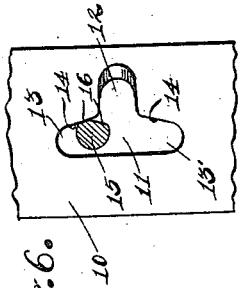
Fig. 6.
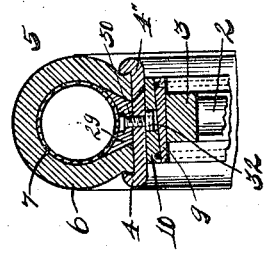
Fig. 4.
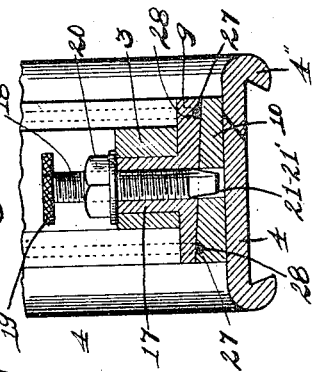
Fig. 5.
Fig. 3.
Witnesses:
C. E. Wessels.
A. A. Olson.
Inventor:
Henry M. Young,
By Joshua R. H. Potts
his Attorney.

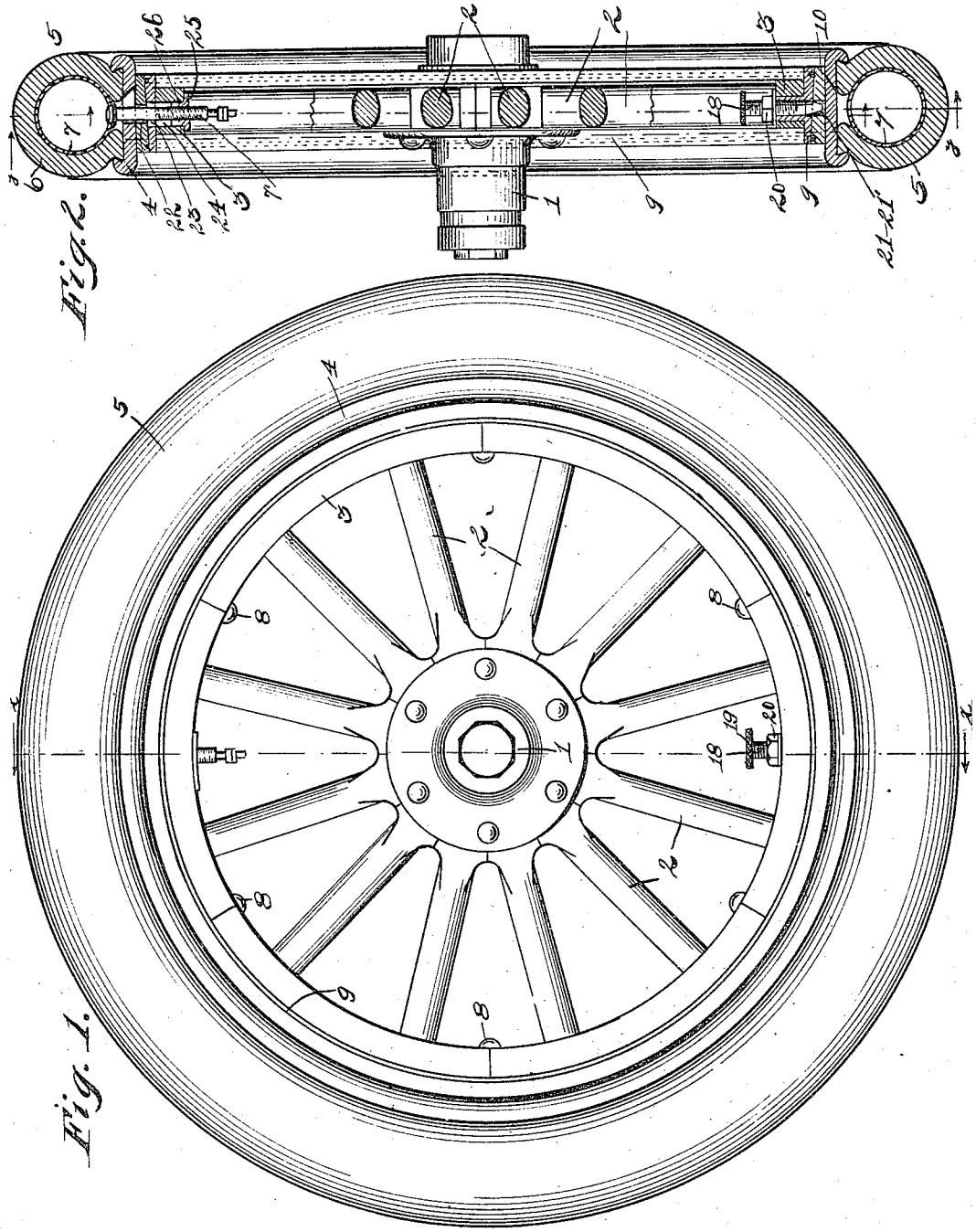

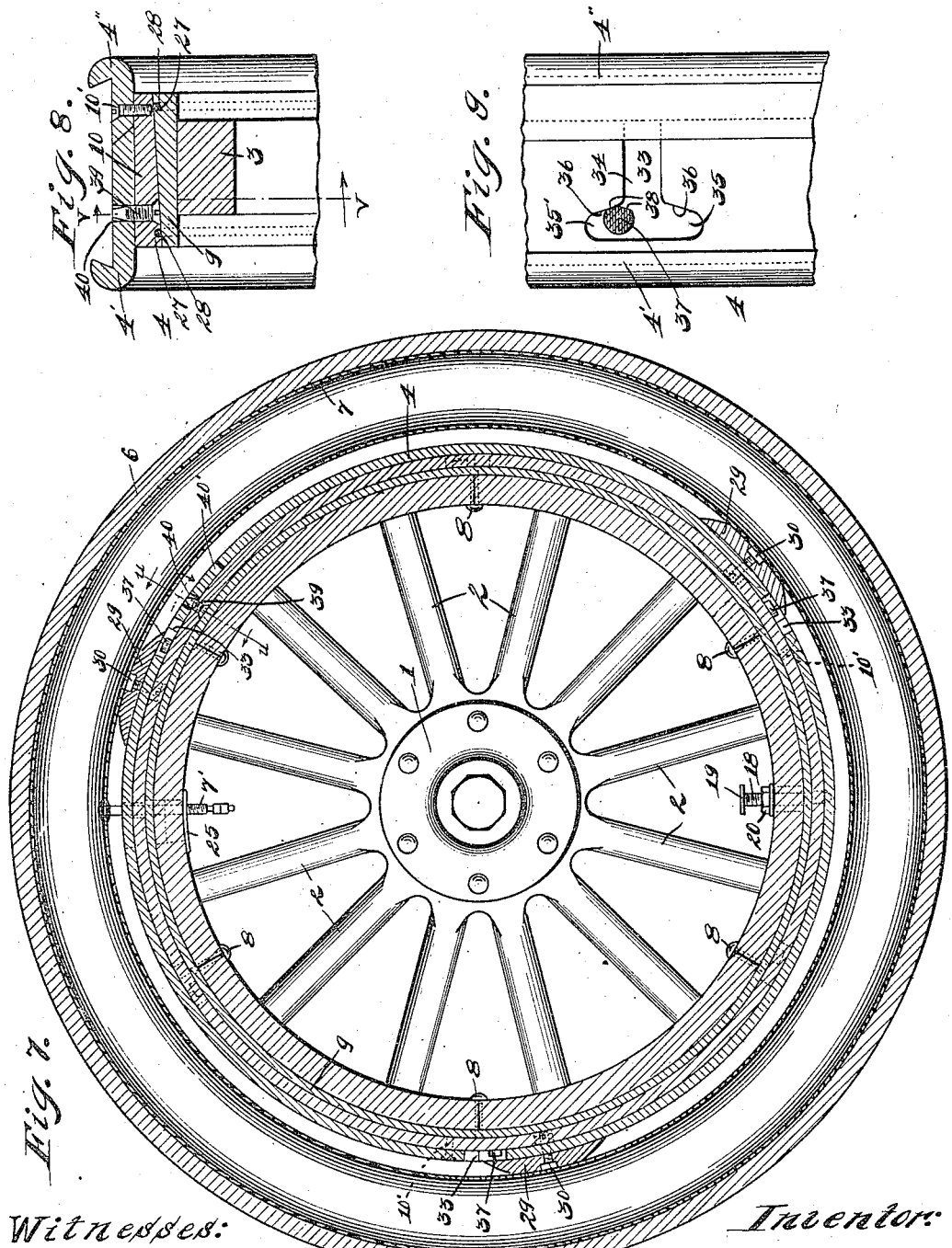

UNITED STATES PATENT OFFICE.

HENRY MASON YOUNG, OF CHICAGO, ILLINOIS.

VEHICLE-WHEEL.

990,328.　　　　　Specification of Letters Patent.　　Patented Apr. 25, 1911.

Application filed May 21, 1910. Serial No. 562,721.

*To all whom it may concern:*

Be it known that I, HENRY M. YOUNG, a citizen of the United States, residing at Chicago, county of Cook, and State of Illinois, have invented certain new and useful Improvements in Vehicle-Wheels, of which the following is a specification.

My invention relates to vehicle wheels and more specifically to a wheel of a demountable rim construction.

The object of my invention is the provision of a vehicle wheel of the character mentioned in which the rim will be so mounted upon the wheel felly as to be adapted for ready and expeditious removal therefrom or attachment thereto.

A further object is the production of a vehicle wheel which will be of comparatively simple and economical construction and efficient in operation.

Other objects will appear hereinafter.

With these objects in view my invention consists in a vehicle wheel characterized as above mentioned and in certain details of construction and arrangement of parts all as will be hereinafter fully described and particularly pointed out in the appended claims.

My invention will be more readily understood by reference to the accompanying drawings forming a part of this specification, and in which, Figure 1 is a side elevation of a vehicle wheel embodying the preferred form of my invention, Fig. 2 is a central transverse section taken on line $x$—$x$ of Fig. 1, Fig. 3 is a section taken on line $y$—$y$ of Fig. 2, Fig. 4 is a transverse section taken on line $z$—$z$ of Fig. 3, Fig. 5 is an enlarged transverse section taken on substantially line $w$—$w$ of Fig. 3, Fig. 6 is an enlarged fragmentary detail illustrating the pin and slot connection between the intermediate rings embodied in the invention, Fig. 7 is a vertical section taken on line $v$—$v$ of Fig. 8, Fig. 8 is a slightly enlarged transverse section taken on line $u$—$u$ of Fig. 7, and Fig. 9 is an enlarged fragmentary detail illustrating the pin and slot connection between the detachable rim section and the adjacent ring.

Referring now to the drawings, 1 indicates the hub of the wheel, 2 the spokes, and 3 the felly which may be assembled in any ordinary or preferred manner.

4 indicates the rim in which is clenched or mounted in the ordinary manner the tire 5. The latter comprises an outer case 6 and an inner air tube 7, 7′ indicating the inwardly projecting valve of said tube which projects through an opening therefor in the rim 4. The rim 4 is formed of two separable sections 4′ and 4″ which are held in operative or clenching positions by means which will be hereinafter described.

Rigidly secured by means of rivet pins 8 centrally upon the periphery of the felly 3 is a metallic ring 9, the periphery of which is of a frustoconical form as shown. Centrally arranged upon the inner side of the rim 4 the same being secured to the section 4″ of the latter by means of screws 10′ is a metallic annulus 10 the inner surface of which is also of a frustoconical form so as to adapt the same to snugly receive the ring 9; the contacting surfaces of the members 9 and 10, when the same are brought together, corresponding identically with each other to form a perfect fit, as clearly shown in Figs. 2, 4 and 5.

Formed in the ring 10 is a plurality of spaced transversely disposed T-slots 11, each of the latter comprising a transversely extending receiving portion 12 the outer extremity of which terminates adjacent the edge of said ring which is of the greatest diameter, and circumferentially extending locking portions 13 and 13′ which are disposed substantially centrally in said ring. The edges 14 of the latter are obliquely disposed, as clearly illustrated in Fig. 6, for a purpose which will be hereinafter set forth. Provided upon the outer surface of the ring 9 is a plurality of outwardly projecting pins or studs 15, the latter being so spaced upon said ring as to be adapted to register with and be received in the slots 11 when the members 9 and 10 are brought together. With this arrangement it will be observed that in order to lock the rim in position upon the wheel felly after adjustment of the same upon the latter with the pins 15 and slots 16 interlocking, it is only required to turn the rim, by a quick move or jerk, through a partial rotation upon the felly. Upon so doing the pins 15 will engage the edges 14 of the slot portions 13 and 13′ depending upon the direction in which the rim was rotated upon the felly. Said edges 14 being inclined, as before stated, the pins 15 in contacting and riding thereon will be guided inwardly and whereby the members 9 and 10 will evidently be forced into close connection or engagement with each other. The pins 15, in order to increase the wearing surfaces thereof are preferably flattened as at 16 for engagement with the edges 14. The portions 13 and 13' are of sufficient length to permit of further insertion of the pins 15 and whereby any wear upon the surfaces 14 and 16 may be taken up. By the provision of slots 13 and 13' extending in opposite directions from the slots 12, provision is made whereby the rim may be arranged upon the felly to capacitate the wheel for use upon either side of the vehicle, that is, for rotation in either direction; it being clear that were but one slot 13 or 13' provided extending from each of the slots 12, the wheel would be adapted for rotation in but one direction, since rotation in the opposite direction, under these conditions, would tend to unlock the pins and slots.

Threaded into the annulus 9, the latter being provided with a nipple 17 for the reception thereof, is a screw 18 bearing a knurled exterior head 19 and a conical or tapering inner end portion. 20 is a lock nut whereby said screw may be locked in any position to which it may be adjusted.

Formed in the ring 10 and rim 4 are two recesses 21 and 21' so arranged therein, that upon the proper arrangement of the rim upon the felly, one or the other will be positioned for engagement by the inner extremity of the screw 18; two recesses being evidently provided to accommodate the two positions, as above described, to which the rim is adapted to be adjusted. Said recesses are so positioned that, when the rim is tightly seated upon the felly, the recess registering with the screw 18 will not be exactly in alinement therewith. The relative position of the registering recess and said screw will be such that, when the latter is rotated into engagement with the recess, one side of the tapering point of the screw will engage one side of the recess so that, upon further rotation of the screw, the members 9 and 10 will be rotated in opposite directions so as to force the locking pins and slots and hence said members into closer engagement with each other. Such construction is clearly shown in Fig. 3. Hence the rim may be securely locked in position upon the felly.

The valve 7' projects through alining perforations 22, 23 and 24 provided respectively in the members 9 and 10 and the felly 3. The perforations 23 and 24, in order to permit of the locking movement of the rim upon the felly, as before described, are elongated; and in order to permit of a slight inclination of the valve, it being evidently necessary, because of said valve, in the course of attachment of the rim, to slightly tilt the latter, said perforations 23 and 24 are made of a width slightly greater than the thickness of said valve, as clearly shown in Fig. 2. A detachable, preferably rubber, plug 25 is secured in the perforation 24, said plug being provided with an opening 26 for the reception of the valve 7'. Said plug is formed inwardly tapering, the same being held in position in the perforation 24 by frictional contact with the sides of the latter. The opening 26 is so arranged in said plug that by simply turning the latter about in the perforation 24, the former will be positioned for reception of said valve with the rim rotated to its other position. The purpose of said plug together with rubber strips 27 seated in circumferential grooves 28 provided in the contacting surfaces of the rings 9 and 10 adjacent the outer edges thereof, is to exclude moisture from said surfaces and to thereby obviate all possibility of rusting. To further guard against the rusting of said surfaces together one or both of the latter may be covered with a coating of copper or any other non-corrosive metal.

29 indicates the usual tire case cleats which are provided to prevent slipping or creeping of the tire case upon the rim. Said cleats are secured to the rim by the usual bolts 30 which project through said cleats and rim, and by nuts 31 threaded upon the inner ends of said bolts. Said nuts are seated in recesses 32 provided for the reception thereof in the ring 10, the exposed end surfaces of each being provided with a transverse slit whereby the same may be screwed or unscrewed by means of a screwdriver or other suitable tool in effecting the clamping or unclamping of the tire case.

With a wheel of construction as set forth it will be noted that in order to demount the rim it is only required to unscrew the locking screw 18 until the latter disengages the perforation 21 or 21' as the case may be. This being done, by partially rotating the rim upon its felly (such rotation being readily effected by a sudden jerk) to position the pins 15 opposite the receiving portions of the slots 11, the rim will be loose and may be removed by laterally tilting the side opposite the valve 7' from engagement with the felly and then by lowering the same from engagement with the opposite side and the valve. To mount the rim the reverse course of procedure is pursued. Thus it will be seen that in mounting or demounting the rim not a single piece, such as a nut, screw, cleat or the like need be removed, all of the parts remaining intact. The advantage of such a construction will be appreciated by those familiar with devices of this character. Further, the construction is strong and durable, and because of its simplicity is not readily susceptible to breakage or to becoming inoperative.

Formed in the rim section 4' is a plurality of spaced transversely disposed T-slots 33 similar to the slots 11 in the ring 10, each of said slots 33 comprising a transversely extending receiving portion 34 which opens at the inner edge of said section and circumferentially extending locking portions 35 which are disposed adjacent the outer edge of said section; the edges 36 of said locking portions, being, as the edges 14 of the slots 11 and for the same reason, disposed obliquely. Provided in the outer surface of the ring 10 is a plurality of outwardly projecting pins or studs 37, the latter being spaced upon said ring for registration with and engagement of the slots 33. Hence, with this arrangement, it will be seen that in order to lock the detachable rim section to the ring 10, when the former is positioned upon the latter with the slots 33 thereof in engagement with the pins 37 of said ring, it is only required to partially rotate said rim section upon said ring. Upon so doing the pins 37 and the slots 33 will co-act precisely in the same manner as the pins 15 and slots 16 above described relative to the members 9 and 10, to lock the rim section 4' upon the rim 10. The contacting sides 38 of said pins 37, as the pins 15 and for the same purpose, are flattened, as clearly shown in Fig. 9. The adjacent edges of the rim sections 4 and 4' are beveled, this bevel, as clearly shown in Fig. 8, being such that, when said sections are brought together, the inner edge portion of the section 4' will be positioned or overlapped by the inner end portion of the section 4', and whereby the same will be securely held in position thereby. Said section 4' may be locked in position by a set-screw 39 threaded in the ring 10, its head being countersunk in the inner surface of the latter, the outer edge thereof, which is conically formed, being adapted to engage either of the slots 40 or 40' provided in said section 4', the purpose of the two slots being understood from the foregoing. In order to permit of the removal of the section 4' and of the rotary movement thereof, as mentioned, a T-slot opening in the inner edge of the former must necessarily be provided for the reception of the valve 7'.

With the construction disclosed it will be observed that in addition to the provision of a wheel having a demountable rim, as above described, a rim is provided which will also permit of ready detachment of the tire case and tire therefrom, since with the rim construction set forth, by simply disengaging the set-screw 39 and by rotating and outwardly moving the section 4' the rim may be disengaged from the pins 37, in which event the tire casing and hence the tire will be free for removal.

While I have shown what I deem to be the preferable form of my wheel I do not wish to be limited thereto as there might be various changes made in the details of construction and the arrangement of parts described without departing from the spirit of the invention comprehended within the scope of the appended claims.

Having described my invention what I claim as new and desire to secure by Letters Patent is:

1. In a wheel, a rim consisting of two circumferential flange sections, a ring fitting against the inner faces of said sections and secured to one thereof, the other section being detachable and provided with a plurality of spaced slots, each of said slots comprising a transverse portion and a circumferential portion having an inclined or angularly disposed locking edge and a like number of pins projecting from said ring to engage said slots, substantially as described.

2. In a device of the class described, a detachable flange section provided with a plurality of spaced T-shaped slots, each of said slots consisting of a transverse portion extending inwardly from one edge of the section and a circumferential portion extending in opposite directions from the inner end, of the transverse portion and the edges of the circumferential portion next to the transverse portion being angularly disposed, substantially as described.

3. A demountable rim having a plurality of spaced T-shaped slots, each slot comprising a transverse portion and a circumferential portion extending in opposite directions from the end of the transverse portion, substantially as described.

4. A demountable rim having a plurality of spaced T-shaped slots, each slot comprising a transverse portion and a circumferential portion extending in opposite directions from the end of the transverse portion, and the edges of the circumferential portions each side of the transverse portion being angularly and oppositely disposed, substantially as described.

In testimony whereof I have signed my name to this specification in the presence of two subscribing witnesses.

HENRY MASON YOUNG.

Witnesses:
HELEN F. LILLIS,
JOSHUA R. H. POTTS.

---

Copies of this patent may be obtained for five cents each, by addressing the "Commissioner of Patents. Washington, D. C."